United States Patent Office.

FREDERICK BAUMANN, OF CHICAGO, ILLINOIS.

Letters Patent No. 95,970, dated October 19, 1869.

IMPROVED COMPOSITION FOR CLEANING STONE.

The Schedule referred to in these Letters Patent and making part of the same.

*To all whom it may concern:*

Be it known that I, FREDERICK BAUMANN, of Chicago, in the county of Cook, and State of Illinois, have invented certain new and useful Improvements in Processes for Cleaning Cut Stone or Marble; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to processes for cleaning cut stone or marble, and restoring them to their original and fresh appearance, after they have taken on an old and dirty color by reason of the action of atmospheric or other influences, and consists in the novel preparation and application of a solution of bioxalate of potassa.

As is well known, many of the varieties of stone employed in the construction of buildings, monuments, &c., contain traces of metallic peroxides, and that their surfaces, when exposed for a time to the influences of the atmosphere, become gradually more and more oxidized, until they at last present a highly discolored and dirty appearance. This is particularly the case with the white limestone quarried in the northern part of the State of Illinois, and used for the construction of fine buildings in the cities of the Northwest. In this case the peroxide of iron gradually becomes hydrated oxide of iron, which gives the face of the stone a dirty yellow appearance.

I have found that the surfaces of this cut stone and marble, so acted upon by the atmosphere or other influences, can be restored to their original freshness and beauty by the application, in a novel manner, of a solution of bioxalate of potassa, after the process as hereinafter described.

For all ordinary purposes I take one pound of the salt of bioxalate of potassa, and dissolve it in one gallon of hot water, and allow the solution to cool.

I then remove the corroded portions and dirt from off the face of the stone, by the use of any of the ordinary appliances of sandstone, pumice-stone, sandpaper, or emery-paper. This leaves the surface clean and smooth, but discolored, when, with a brush, sponge, or other suitable article, I apply the above solution until the effect is evident, which is seen in the restoration of the surface of the stone to its original and fresh appearance. I then thoroughly cleanse with water.

In cases where the corrosion or disintegration has made considerable headway, the solution above given may not be sufficiently strong, and in that case I add about one pound of sulphuric acid to one pound of the solution. The sulphuric acid will combine with the potassa contained in the solution, and thus free a corresponding quantity of the oxalic acid; and as the sulphate of potassa has no effect, and the quantity of free oxalic acid is increased, the solution has become stronger and more effective.

This solution I employ when the corrosion has already made considerable headway.

It is obvious that this process will have no effect when the discoloring-agent of the stone is not a metallic oxide, as the oxalic acid will only combine with such agent, and this combination being soluble in water, is easily removed by washing.

While I have found the proportions above given, for making an effective solution all that was desired, yet I do not confine myself to them.

Having thus described my invention,

What I claim, is—

The application of the bioxalate of potassa in aqueous solution, whether mixed or not with sulphuric acid or its equivalent, to the surfaces of stone, in the manner substantially as herein described and for the purposes set forth.

F. BAUMANN.

Witnesses:
EDWARD BAUMANN,
KARL F. HEINZEN.